United States Patent
Cheng et al.

(10) Patent No.: US 9,563,050 B2
(45) Date of Patent: Feb. 7, 2017

(54) LENS COVER

(71) Applicants: Carson Cheng, City of Industry, CA (US); Jason Michael Cheng, City of Industry, CA (US); Changan Tian, City of Industry, CA (US)

(72) Inventors: Carson Cheng, City of Industry, CA (US); Jason Michael Cheng, City of Industry, CA (US); Changan Tian, City of Industry, CA (US)

(73) Assignee: N cSTAR, Inc., City of Industry, CA (US)

(*) Notice: Subject to any disclaimer, the term of this patent is extended or adjusted under 35 U.S.C. 154(b) by 36 days.

(21) Appl. No.: 14/179,515

(22) Filed: Feb. 12, 2014

(65) Prior Publication Data

US 2015/0226960 A1    Aug. 13, 2015

(51) Int. Cl.
*G02B 23/16* (2006.01)
*F41G 1/38* (2006.01)
*G03B 11/04* (2006.01)

(52) U.S. Cl.
CPC ............... *G02B 23/16* (2013.01); *F41G 1/383* (2013.01); *G03B 11/041* (2013.01)

(58) Field of Classification Search
CPC .................. G02B 23/16; G02B 6/3849; G03B 11/04–11/048; F41G 1/383; F41G 1/027; F41G 11/004; F41G 11/008
USPC ..................... 359/511, 600, 611; 42/129, 143
See application file for complete search history.

(56) References Cited

U.S. PATENT DOCUMENTS

| | | | | |
|---|---|---|---|---|
| 2,632,252 A * | 3/1953 | Blais, Sr. | | 359/511 |
| 4,909,617 A * | 3/1990 | Boyd | | G03B 11/045 |
| | | | | 359/511 |
| 6,799,854 B1 * | 10/2004 | Steiner | | G02B 23/16 |
| | | | | 359/511 |
| 2002/0167731 A1 * | 11/2002 | Watson | | F41G 1/383 |
| | | | | 359/611 |
| 2006/0218841 A1 * | 10/2006 | Campean | | 42/129 |
| 2008/0186584 A1 * | 8/2008 | Ballard | | 359/611 |
| 2010/0027120 A1 * | 2/2010 | Elowitz | | 359/511 |
| 2012/0240641 A1 * | 9/2012 | Fong | | 70/58 |

* cited by examiner

*Primary Examiner* — Darryl J Collins
*Assistant Examiner* — Journey Sumlar
(74) *Attorney, Agent, or Firm* — Raymond Y. Chan; David and Raymond Patent Firm (57) ABSTRACT

A lens cover for a lens equipment includes a tubular cover body for detachably coupling at a lens housing of the lens equipment in front of a lens thereof, a cover module, and a locking mechanism. The cover module includes a cover panel and a joint unit coupled between a sidewall of the cover body and a peripheral edge of the cover panel to enable the cover panel to be moved between a covered position and an uncovered position, wherein in the covered position, the cover panel is supported at a front portion of the cover body for covering the lens, and in the uncovered position, the cover panel is rotated sidewardly about the joint unit for uncovering the lens. The locking mechanism is provided at the sidewall of the cover body for releasably locking the cover panel in the covered position.

22 Claims, 11 Drawing Sheets

LENS COVER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an accessory for a lens equipment, and more particular to a lens cover for a lens equipment, such as a scope, which can be easily mounted to the lens equipment to protect the lens thereof and can be quickly folded sideward at its opened position.

Description of Related Arts

Lens equipment, such as a scope, telescope, camera lens module, or binoculars, generally comprises a tubular lens housing and a lens supported in the lens housing. For example, scopes are sighting device and are commonly used on firearms, such as rifles, to give an accurate aiming point during shooting. The scope generally comprises a tubular lens housing and two lenses provided at two ends of the lens housing to define an objective end and a sight (ocular) end. Accordingly, the quality of each of the lens will be reduced when the lens is scratched or covered by dust. Therefore, a lens cover is usually utilized to cover the lens when it is not in used.

The conventional lens cover comprises a tubular body detachably coupled at the end of either the objective lens housing or ocular lens housing and a cover panel movably attached to the tubular body via a hinge, wherein the cover is held at a front opening of the tubular body to cover the lens and is flipped upwardly from the tubular body to uncover the lens. However, such lens cover has several drawbacks. Since the cover panel is flipped upwardly from the front opening of the tubular body, the flipping movement of the cover panel requires a relative space in front of the tubular body. In other words, after the scope is coupled at the firearm, no additional accessory can be coupled in front of the scope that will block the flipping movement of the cover panel. Furthermore, when the cover panel is flipped upwardly, the cover panel will block the sight of the shooter. The hinge must incorporate a coil to force the upward flipping movement of the cover panel. Since the hinge must be located at the exterior of the tubular body, the hinge is not protected. Once the hinge is broken by any external force, the lens cover will not be flip-opened or closed at all.

Another type of lens cover is a shutter type lens cover, wherein a plurality of shutter blades that side in and out from the center of the front opening of the tubular body. In particular, one end of the shutter blade is affixed in position while the other end of the shutter blade is moved back and forth. Therefore, the shutter blades are moved away from the center of the tubular body for opening up the front opening thereof and are moved toward the center of the tubular body for opening up the front opening thereof. As a result, in the opened position of the shutter type lens cover, the shutter blades will not block the sight of the shooter. Generally, the more shutter blades there are in the tubular body, the more rounded the opening will be. The opening diameter of the shutter blades should be larger than a diameter of the lens. In other words, the shutter type lens cover will involve a relatively complicated structure comparing with the flip type lens cover. More importantly, the shutter blades will be jammed or stuck by dirt, sand, or dust. Once the shutter blades are stuck, the shutter type lens cover will malfunction. It is worth mentioning that the shutter blades cannot be fully closed that there is always an aperture at the center of the tubular body.

Moreover, the common drawback of the flip type lens cover and the shutter type lens cover is that a diameter of the tubular body must match with a diameter of the lens housing in order to couple the tubular body with the lens housing. In other words, there is no universal lens cover that fits different sizes of scopes.

SUMMARY OF THE PRESENT INVENTION

The invention is advantageous in that it provides a lens cover which can be easily mounted to the lens equipment to protect the lens thereof and can be quickly folded sideward at its uncovered position.

Another advantage of the invention is to provide a lens cover, wherein the cover panel is rotated sidewardly and flipped at the side of the cover body, such that the sight of the viewer will not be blocked by the cover panel. In addition, the flipped cover panel will not be hit by any object to prevent the cover body from being broken accidentally.

Another advantage of the invention is to provide a lens cover, wherein two folding movements of the cover panel at two different directions are continuously provided in order to move the cover panel in the uncovered position.

Another advantage of the invention is to provide a lens cover, wherein a guiding slot is formed at a front portion of the cover body to guide the cover panel to be slid back to its covered position.

Another advantage of the invention is to provide a lens cover, which comprises a locking mechanism to lock up the cover panel in the covered position.

Another advantage of the invention is to provide a lens cover, wherein the two different folding movements of the cover panel are continuously provided by one single unlocking action of the locking mechanism. In other words, the cover panel is actuated by a simple unlocking movement to quickly and simultaneously uncover the lens.

Another advantage of the invention is to provide a lens cover, which comprises a flexible member provided at an interior side of the cover body, such that the cover body serves a universal lens cover to fit different diameter sizes of the lens housings.

Another advantage of the invention is to provide a lens cover, which does not require to alter the original structural design of the lens equipment, so as to minimize the manufacturing cost of the lens equipment incorporating with the lens cover.

Another advantage of the invention is to provide a lens cover, wherein no expensive or complicated structure is required to employ in the present invention in order to achieve the above mentioned objects. Therefore, the present invention successfully provides an economic and efficient solution for providing a secure and reliable configuration for the lens cover.

Additional advantages and features of the invention will become apparent from the description which follows, and may be realized by means of the instrumentalities and combinations particularly point out in the appended claims.

According to the present invention, the foregoing and other objectives and advantages are attained by a lens cover for a lens equipment which comprises a lens received at an opening of a lens housing, wherein the lens cover comprises a tubular cover body, a cover module and a locking mechanism.

The tubular cover comprises a tubular sidewall for detachably coupling at the lens housing in front of the lens thereof, such that the sidewall is coaxially extended from the lens housing of the lens equipment.

The cover module comprises a cover panel and a joint unit coupled between the sidewall of the cover body and a peripheral edge of the cover panel to enable the cover panel to be moved between a covered position and an uncovered position. In the covered position, the cover panel is supported at a front portion of the cover body for covering the lens. In the uncovered position, the cover panel is rotated sidewardly about the joint unit for uncovering the lens.

The locking mechanism is provided at the sidewall of the cover body for releasably locking the cover panel in the covered position.

Still further objectives and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
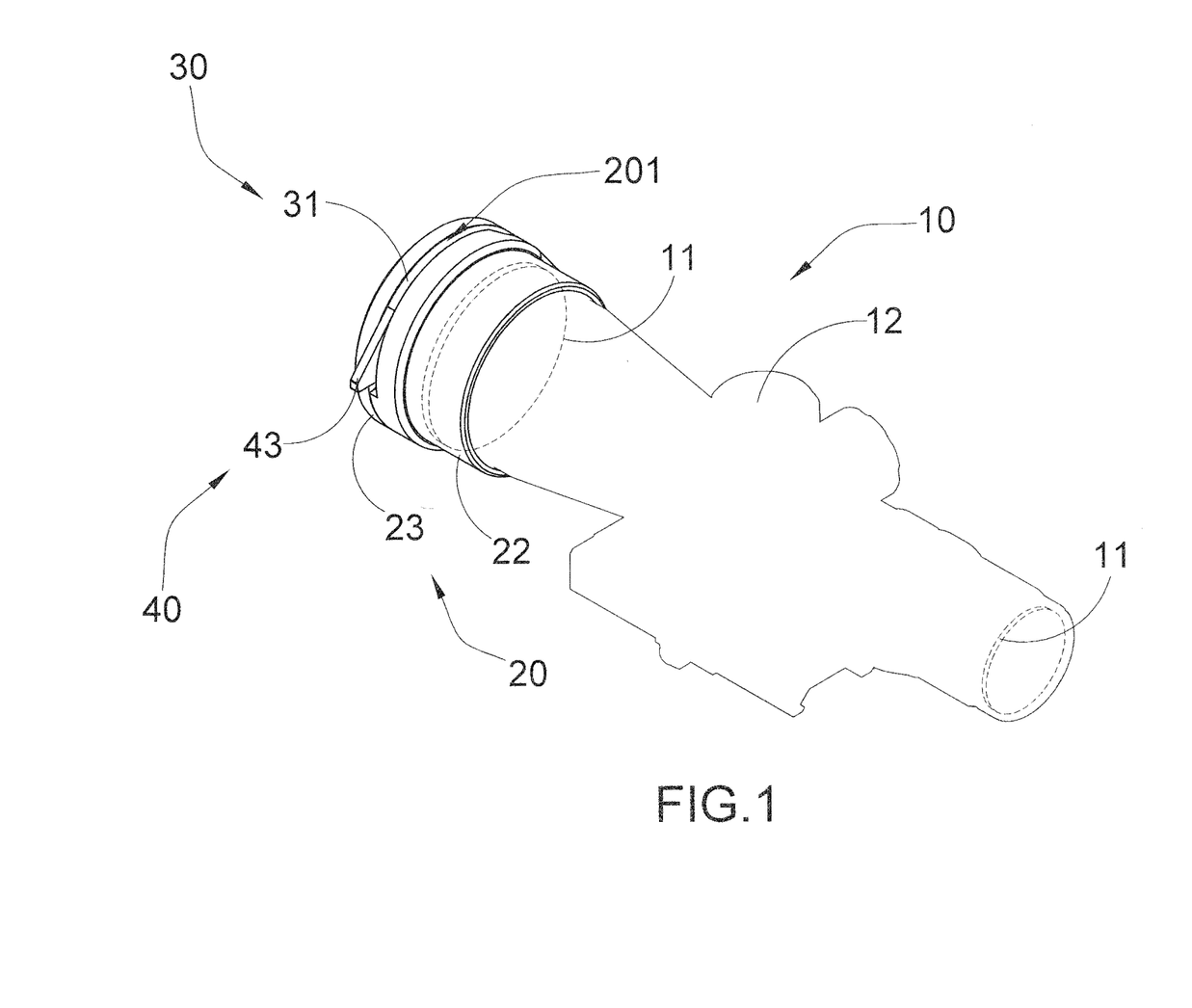
FIG. 1 is a perspective view of a lens cover coupled at the lens equipment according to a preferred embodiment of the present invention.

Referring to FIG. 1 of the drawings, a lens cover for a lens equipment 10 according to a preferred embodiment of the present invention is illustrated, wherein the lens equipment 10 comprises a lens 11 received at an opening of a lens housing 12. Accordingly, the lens equipment 10, such as a scope as shown in FIG. 1, has an objective end and a sight end that the lens 11 is supported in the lens housing 12 at each of the objective end and the sight end thereof. The lens cover of the present invention can be detachably coupled at the objective end and/or the sight end of the lens equipment 10 to protect the lens 11 thereof. It should be appreciated that the lens cover of the present invention can incorporate with different lens equipments 10, such as scope, telescope, camera lens module, or binoculars.

Figure 2:
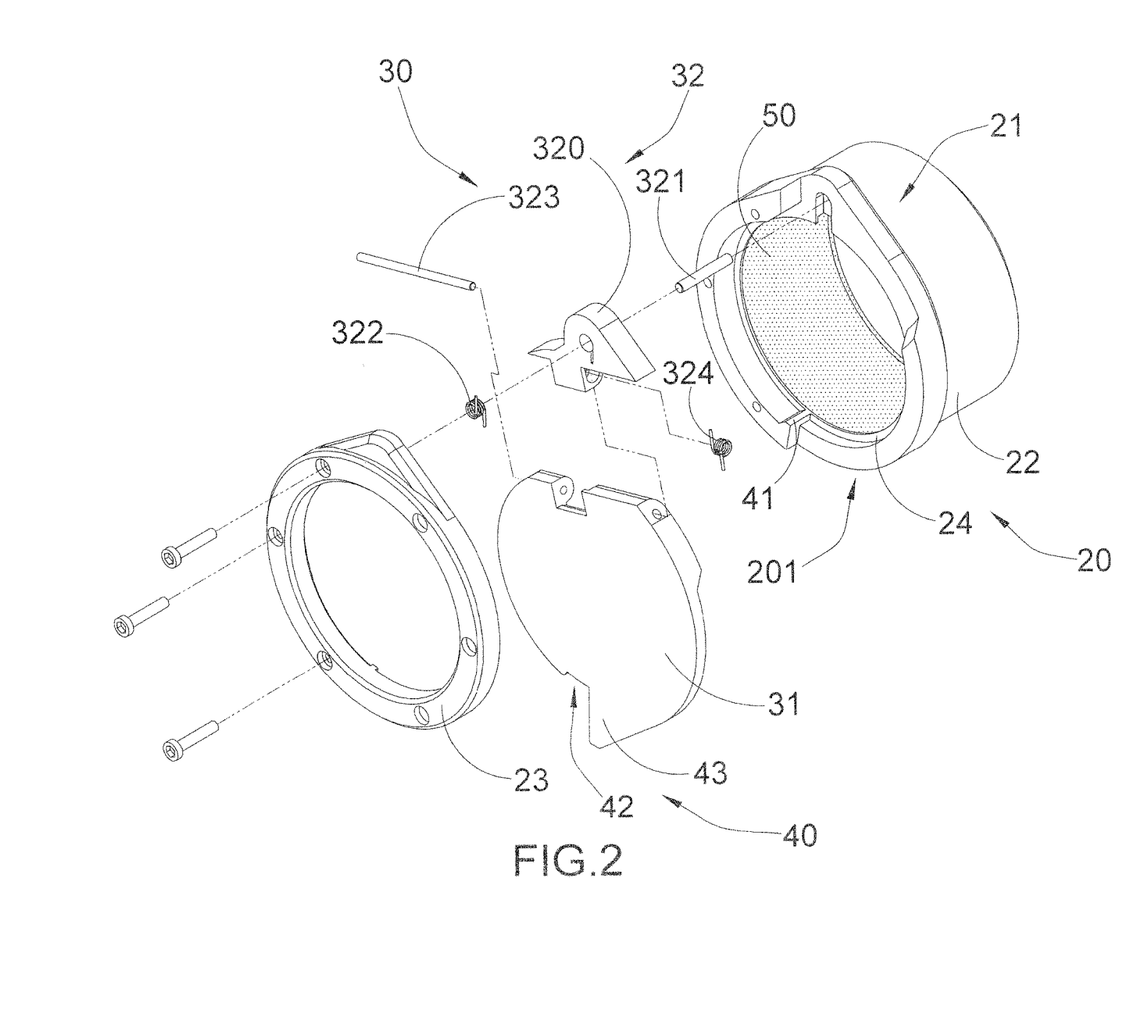
FIG. 2 is an exploded perspective view of the lens cover according to the above preferred embodiment of the present invention.
Figure 3:
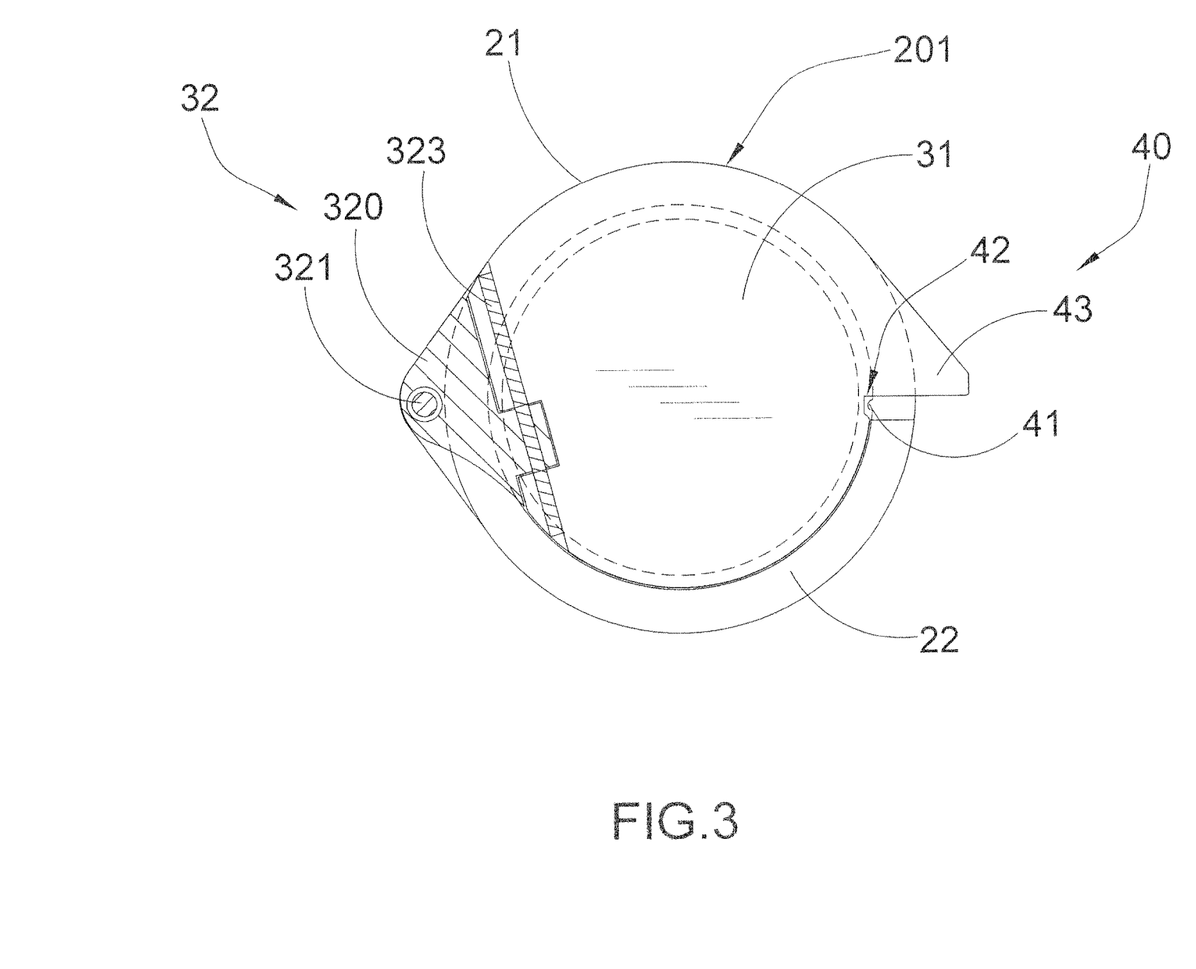
FIG. 3 is a front sectional view of the lens cover according to the above preferred embodiment of the present invention, illustrating the locking mechanism.
Figure 4:
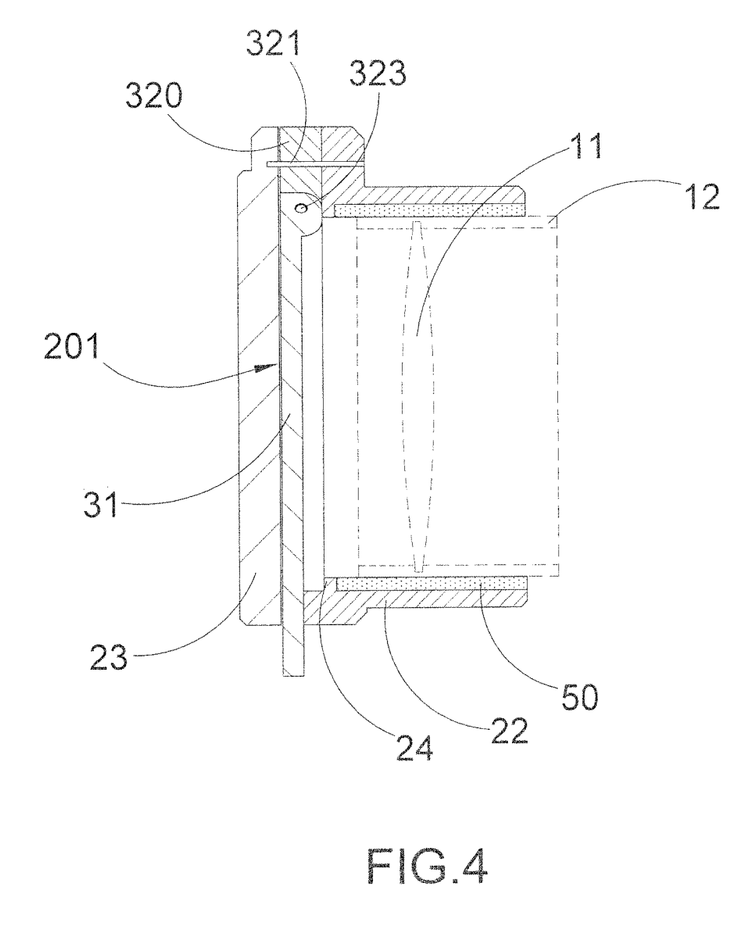
FIG. 4 is a side sectional view of the lens cover according to the above preferred embodiment of the present invention.

As shown in FIGS. 2 to 4, the lens cover comprises a tubular cover body 20, a cover module 30 and a locking mechanism 40. Accordingly, FIG. 1 illustrates the lens cover mounted at the objective end of the lens equipment 10 as an example to protect the lens 11 thereat. It is appreciated that the lens cover of the present invention can be mounted at the sight end of the lens equipment 10 as well.

The cover body 20 comprises a tubular sidewall 21 defining an interior cavity for coaxially receiving a front portion of the lens housing 12, wherein a guiding slot 201 is circumferentially formed at the sidewall 21 of the cover body 20 at the front portion thereof. As shown in FIG. 2, the cover body 20 further comprises an attachment body 22 for detachably coupling at the lens housing 12, and a ring-shaped front frame 23 coupled at a front edge of the attachment body 22, wherein the guiding slot 201 is formed between the front edge of the attachment body 22 and the front frame 23.

In particular, the front edge of the attachment body 22 has an indented portion configured in an arc shape that when the front frame 23 is coupled at the front edge of the attachment body 22, the guiding slot 201 is formed between the indented portion of the front edge of the attachment body 22 and the front frame 23.

The cover body 20 further comprises a blocking rim 24 circumferentially protruded from an interior side of the cover body 20. In particular, the blocking rim 24 is circumferentially protruded from the inner side of the attachment body 22 and is located behind the guiding slot 201. When the lens housing 12 is slidably inserted into the cover body 20, the front edge of the lens housing 12 is blocked by the blocking rim 24 to prevent any further forward sliding movement of the lens housing 12.

In order to fittingly secure the cover body 20 at the lens housing 12 of the lens equipment 10, the lens cover further comprises a flexible member 50 provided at the interior side of the sidewall 21 of the cover body 20. Preferably, the flexible member 50 is located behind the blocking rim 24 to engage with the exterior surface of the lens housing 12 when the lens housing 12 is slidably inserted into the cover body 20. Accordingly, the flexible member 50 can be a foam material or rubber having a predetermined thickness adapted to be compressed for being sandwiched between the sidewall 21 of the cover body 20 and the lens housing 12 so as to enable the lens housing 12 to be fitted into the sidewall 21 of the cover body 20.

It is worth mentioning that due to the flexibility of the flexible member 50, the cover body 20 can fit for different diameter sizes of the lens housing 12. For example, the cover body 20 can fit the lens housing 12 with a diameter range between 32 mm and 36 mm. Therefore, the lens cover of the present invention can be a universal lens cover for fitting different diameter sizes of the lens equipment 10.

Likewise, by changing different sizes of the flexible member 50, the cover body 20 can also fit for different diameter sizes of the lens housing 12. When a thicker flexible member 50 is used, the cover body 20 can fit the lens housing 12 with a smaller diameter size. When a thinner flexible member 50 is used, the cover body 20 can fit the lens housing 12 with a bigger diameter size.

Figure 7:
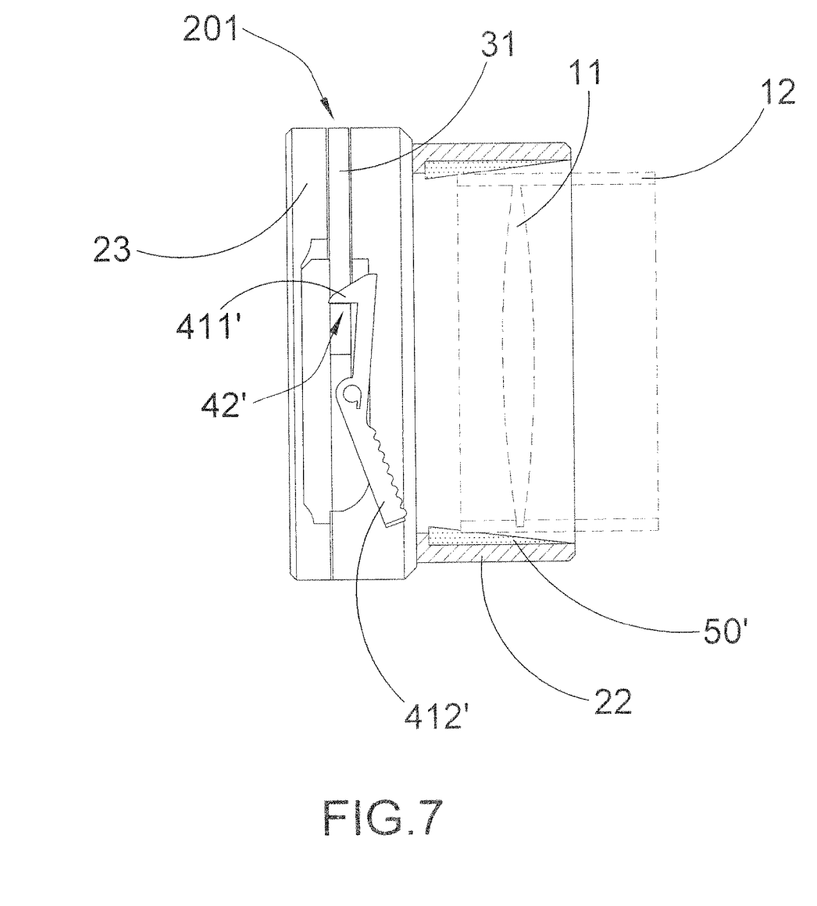
FIG. 7 is a side sectional view of the lens cover according to the above preferred embodiment of the present invention, illustrating the first alternative mode of the locking mechanism.

Alternatively, the flexible member 50' may have a slanted engaging surface that the thickness of the flexible member 50' is gradually increasing toward the front portion of the cover body 10, as shown in FIG. 7. Therefore, the diameter of the flexible member 50' will match with the diameter of the lens housing 12 when the exterior surface of the lens housing 12 is engaged with the slanted engaging surface of the flexible member 50' so as to enable the lens housing 12 to be fitted into the sidewall 21 of the cover body 20. It is worth mentioning that once the diameter of the lens housing 12 matches with the diameter of the flexible member 50' at the slanted engaging surface thereof, the flexible member 50' will then be pressed by the further forward sliding movement of the lens housing 12 into the sidewall 21 of the cover body 20.

The cover module 30 comprises a cover panel 31 and a joint unit 32 coupled between the sidewall 21 of the cover body 20 and a peripheral edge of the cover panel 31 to enable the cover panel 31 to be moved between a covered position and an uncovered position. Accordingly, in the covered position, the cover panel 31 is supported at the front portion of the cover body 20 for covering the lens 11, and in the uncovered position, the cover panel 31 is rotated sidewardly about the joint unit 32 for uncovering the lens 11. It is worth mentioning that the cover panel 31 of the present invention is not pivotally flipped at a sideward direction but is rotated at the sideward direction. Therefore, the rotational movement of the cover panel 31 will not be blocked by any object in front of the objective end of the lens equipment 10. In particular, the cover panel 31 is upwardly and sidewardly rotated at the joint unit 32 from the covered position. In other words, the cover panel 31 of the present invention can be rotated either to the left side of the cover body 20 or to the right side of the cover 20 via the joint unit 32.

The locking mechanism 40 is extended from the cover body 20 for releasably locking the cover panel 31 in the covered position. Therefore, once the locking mechanism 40 is released the engagement between the cover panel 31 and the cover body 20, the cover panel 31 is rotated sidewardly via the joint unit 32. Accordingly, the joint unit 32 and the locking mechanism 40 are spacedly located at the sidewall 21 of the cover body 20. In other words, the joint unit 32 and the locking mechanism 40 are spacedly provided at the peripheral edge of the cover panel 31. Preferably, the joint unit 32 and the locking mechanism 40 are located at two opposite sides of the sidewall 21 of the cover body 20. In addition, the guiding slot 201 is through slot formed at the sidewall 21 of the cover body 20 and is extended from the joint unit 32 to the locking mechanism 40. Preferably, the length of the guiding slot 201 is half of the circumference of the cover body 20. In other words, two ends of the guiding slot 201 are located at the diameter of the cover body 20 and defined at two ends of the indented portion of the front edge of the attachment body 22.

As shown in FIG. 3, the joint unit 32 is located at the left side of the sidewall 21 of the cover body 20 while the locking mechanism 40 is located at the right side of the sidewall 21 of the cover body 20. Therefore, the cover panel 31 will be rotated at the left side of the sidewall 21 of the cover body 20 from the covered position.

As shown in FIGS. 2 and 4, the cover panel 31 is guided to slide at the guiding slot 201 to the covered position and is guided to slide out of the guiding slot 201 to the uncovered position. Accordingly, when the cover panel 31 is guided at the guiding slot 201, the cover panel 31 is guided to receive behind the front frame 23 of the cover body 20 in the covered position. A width of the guiding slot 201 is slightly larger than a thickness of the cover panel 31, such that the guiding slot 201 will guide the rotational movement of the cover panel 31 from the covered position to the uncovered position.

Figure 5:
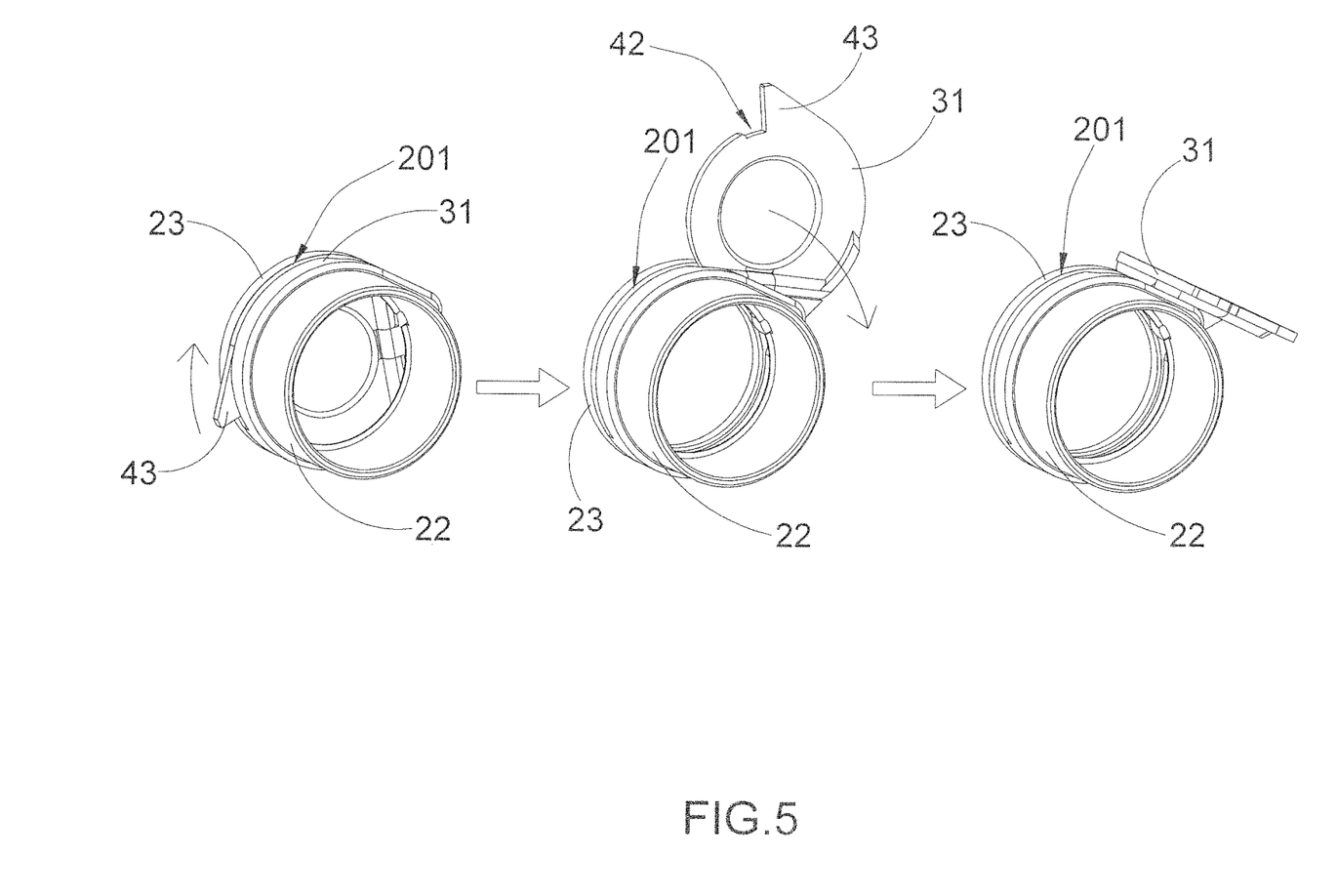
FIG. 5 illustrates the folding movement of the cover panel of the lens cover according to the above preferred embodiment of the present invention, illustrating the cover panel in a covered position, in an initial state of an uncovered position, and in a final state of the uncovered position.

According to the preferred embodiment, the cover panel 31 is moved from the covered position to the uncovered position, wherein the uncovered position is defined to have an initial state and a final state. In the initial state of the uncovered position, the cover panel 31 is rotated sidewardly from the sidewall 21 of the cover body 20. In the final state of the uncovered position, the cover panel 31 is rotatably flipped to rest on the sidewall 21 of the cover body 20, as shown in FIG. 5.

Accordingly, the joint unit 32 comprises a rotatable joint and a flipping joint integrated to form a joint member 320 to couple between the sidewall 21 of the cover body 20 and the peripheral edge of the cover panel 31. The rotatable joint is coupled at the sidewall 21 of the cover body 20 to enable the cover panel 31 to be sidewardly rotated at the rotatable joint so as to move the cover panel 31 in an initial state of the uncovered position. The flipping joint is coupled at the peripheral edge of the cover panel 31 to enable the cover panel 31 to be rearwardly flipped to rest on the sidewall 21 of the cover body 20 so as to move the cover panel 31 in the final state of the uncovered position. The rotational movement and the flipping movement of the cover panel 31 are two individual movements at two different directions that the flipping movement of the cover panels 31 is a consequent movement following the rotational movement thereof. Therefore, the two movements of the cover panel 31 form a continuous folding movement of the cover panel 31 to move the cover panel 31 from the covered position to the uncovered position.

As shown in FIG. 2, the rotatable joint comprises a first rotatable shaft 321 coupled at the sidewall 21 of the cover body 20 and a first resilient element 322 coupled at the first rotatable shaft 321 for applying a pushing force against the cover panel 31 to push the cover panel 31 being rotated about the first rotatable shaft 321 to the initial state of the uncovered position.

The joint member 320 is coupled at the sidewall 21 of the cover body 20 via the first rotatable shaft 321. The first rotatable shaft 321 is located at one end of the guiding slot 201 and is orientated parallelly to the sidewall 21 of the cover body 20, wherein the first rotatable shaft 321 serves as a rotatable axle that the cover panel 31 is rotated with respect to the first rotatable shaft 321.

The first resilient element 322 comprises a coil spring having a coil body coupled at the first rotatable shaft 321 and two coil arms biasing against the joint member 320 and the sidewall 21 of the cover body 20. Therefore, when the locking mechanism 40 is unlocked, the first resilient element 322 will apply the rotatable pushing force against the cover panel 31 to push the cover panel 31 to slide out of the guiding slot 201 from the covered position to the initial state of the uncovered position.

The flipping joint comprises a second rotatable shaft 323 coupled at the peripheral edge of the cover panel 31 and a second resilient element 324 coupled at the second rotatable shaft 323 for applying a pushing force against the cover panel 31 to push the cover panel 31 being flipped about the second rotatable shaft 323 to the final state of the uncovered position.

The joint member 320 is coupled at the peripheral edge of the cover panel 31 via the second rotatable shaft 323. The second rotatable shaft 323 serves a rotatable axle that the cover panel 31 is rearwardly flipped to rest on the sidewall 21 of the cover body 20 with respect to the second rotatable shaft 323. Accordingly, the first and second rotatable shafts 321, 323 are orientated perpendicularly to each other. Therefore, the rotational movement and the flipping movement of the cover panel 31 are provided at two different directions.

The second resilient element 234 is another coil spring that has a coil body coupled at the second rotatable shaft 323 and two coil arms biasing against the joint member 320 and the peripheral edge of the cover panel 31. Therefore, when the cover panel 31 is moved in the initial state of the uncovered position, the second resilient element 324 will apply the rearward pushing force against the cover panel 31 to push the cover panel 31 so as to rearwardly flip the cover panel 31 from the initial state of the uncovered position to the final state of the uncovered position. It is worth mentioning that since the cover panel 31 is rearwardly flipped to rest on the exterior surface of the sidewall 21 of the cover body 20 in the final state of the uncovered position, the sight of the viewer will not be blocked by the cover panel 31.

As shown FIG. 3, the locking mechanism 40 comprises a locking latch 41 formed at the sidewall 21 of the cover body 20 and a locking fastener 42 formed at the peripheral edge of the cover panel 31 in such a manner that when the cover panel 31 is rotated to cover at the cover body 20, the locking fastener 42 is engaged with the locking latch 41 to retain the cover panel 31 in the covered position.

According to the preferred embodiment, the locking latch 41 is supported at an opposed end of the guiding slot 201 and is integrally protruded from an inner side of the sidewall 21 of the cover body 20. The locking fastener 42 integrally formed at the peripheral edge of the cover panel 31 to serve as an indented locking edge portion thereof. The cover panel 31 is guided to slide into the guiding slot 201 until the locking fastener 42 is engaged with the locking latch 41 to retain the cover panel 31 in the covered position.

In order to unlock the locking mechanism 40, the locking mechanism 40 further comprises a handle member 43 integrally and outwardly extended from the peripheral edge of the cover panel 31 corresponding to the locking fastener 42. When the handle member 43 is sidewardly pushed, the locking fastener 42 is disengaged with the locking latch 41 to enable the cover panel 31 to be moved in the initial state of the uncovered position. Accordingly, the handle member 43 is radially and outwardly projected from the peripheral edge of the cover panel 31 to extend out of the guiding slot 201. Therefore, the viewer is able to manually push the handle member 43 at the sideward direction in order to unlock the engagement between the locking latch 41 and the locking fastener 42.

Accordingly, the viewer is able to mount the lens cover of the present invention to the lens equipment 10 by simply inserting the lens housing 12 into the sidewall 21 of the cover body 20. Therefore, the lens 11 will be covered by the cover panel 31 when the cover panel 31 is moved in the covered position. In order to move the cover panel 31 from the covered position to the uncovered position, the viewer is able to manually apply the sideward pushing force at the handle member 43 to disengage the locking fastener with the locking latch 41. Then, the first resilient element 322 will automatically generate the pushing force against the cover panel 31 to push the cover panel 31 being rotated about the first rotatable shaft 321 and being slid out of the guiding slot 201 from the covered position to the initial state of the uncovered position. The second resilient element 324 will subsequently apply the rearward pushing force against the cover panel 31 to push the cover panel 31 so as to rearwardly flip the cover panel 31 from the initial state of the uncovered position to the final state of the uncovered position. Therefore, the viewer will only require apply one pushing force to unlock the locking mechanism to generate two different movements, i.e. the rotational movement and the flipping movement, of the cover panel 31.

In order to fold the cover panel 31 back to the covered position, the viewer is able to frontwardly flip the cover panel 31 from the final state of the uncovered position to the initial state of the uncovered position. Then, the cover panel 31 can be slid back to the guiding slot 201 until the locking fastener 42 is engaged with the locking latch 41. It is worth mentioning that the guiding slot 201 will also ensure the alignment between the locking fastener 42 and the locking latch 41 when the cover panel 31 is slid at the guiding slot 201.

Figure 6:
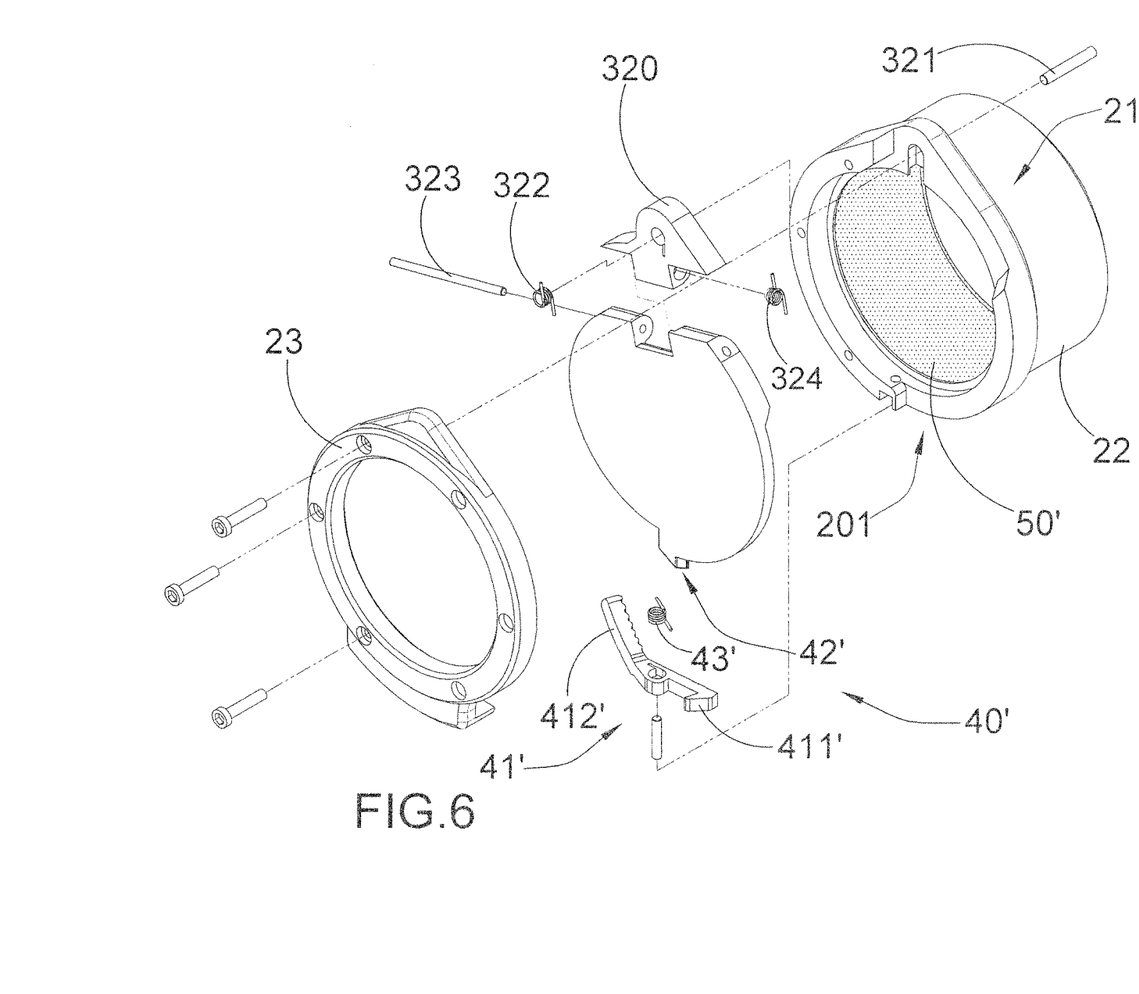
FIG. 6 illustrates a first alternative mode of the locking mechanism of the lens cover according to the above preferred embodiment of the present invention.
Figure 8:
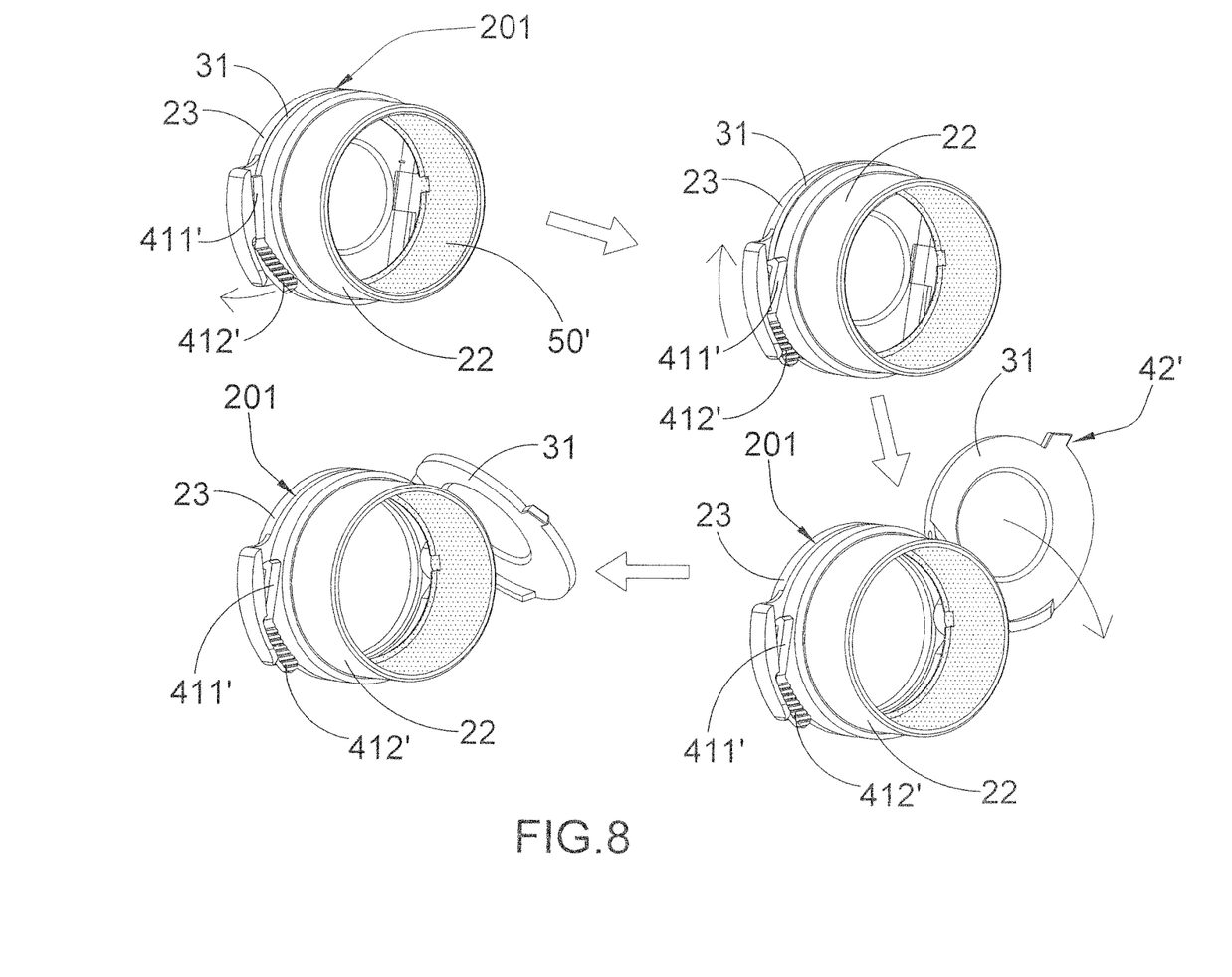
FIG. 8 illustrates the folding movement of the cover panel of the lens cover via the first alternative locking mechanism according to the above preferred embodiment of the present invention, illustrating the cover panel in a covered position, in an initial state of an uncovered position, and in a final state of the uncovered position.

FIGS. 6 to 8 illustrates a first alternative mode of the locking mechanism 40', which comprises a locking latch 41' formed at the sidewall 21 of the cover body 20 and a locking fastener 42' formed at the peripheral edge of the cover panel 31 in such a manner that when the cover panel 31 is rotated to cover at the cover body 20, the locking fastener 42' is engaged with the locking latch 41' to retain the cover panel 31 in the covered position.

Accordingly, the locking latch 41' is formed at an opposed end of the guiding slot 201 and comprises a pivot latch, which is pivotally coupled at the sidewall 21 of the cover body 20, having a catching end 411' engaging with the locking fastener 42' and an actuating end 412' arranged in such a manner that when the actuating end 412' of the pivot latch is pressed, the catching end 411' of the pivot latch is disengaged with the locking fastener 42' to enable the cover panel 31 to be moved in the uncovered position. A locker coil spring 43' is coupled at a pivot point of the locking latch 41' between the catching end 411' and the actuating end 412' for applying a spring force against the catching end 411' so as to ensure the catching end 411' normally engaged with the locking fastener 42'.

The locking fastener 42' integrally formed at the peripheral edge of the cover panel 31 to serve as a protruded locking edge portion thereof. The cover panel 31 is guided to slide into the guiding slot 201 until the locking fastener 42' is engaged with the catching end 411' of the locking latch 41' to retain the cover panel 31 in the covered position. Therefore, once the locking mechanism 40' is released, the cover panel 31 is outwardly rotated from the covered position to the initial state of the uncovered position and is then rearwardly flipped in the final state of the uncovered position, as shown in FIG. 8.

Figure 9:
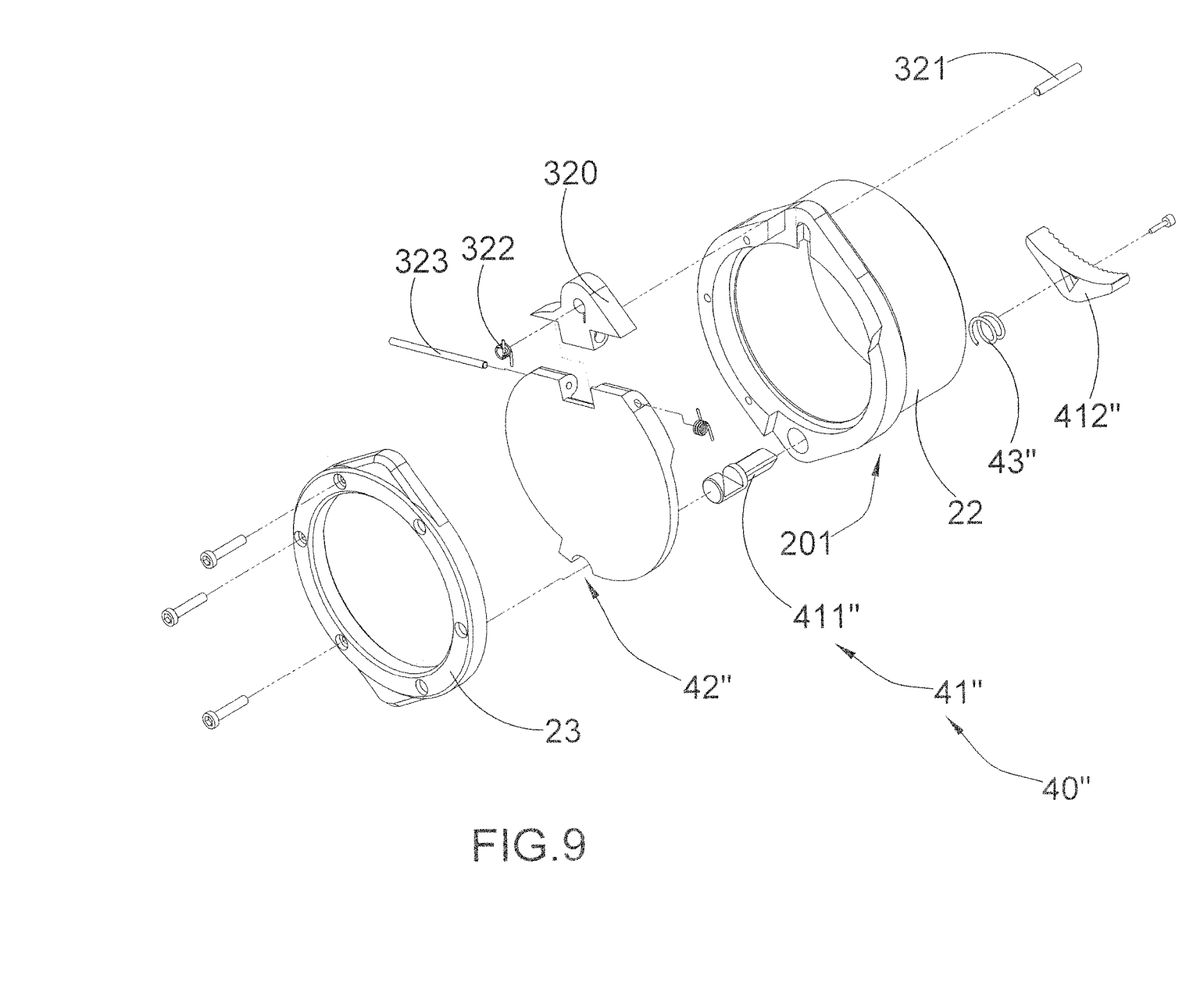
FIG. 9 illustrates a second alternative mode of the locking mechanism of the lens cover according to the above preferred embodiment of the present invention.
Figure 10:
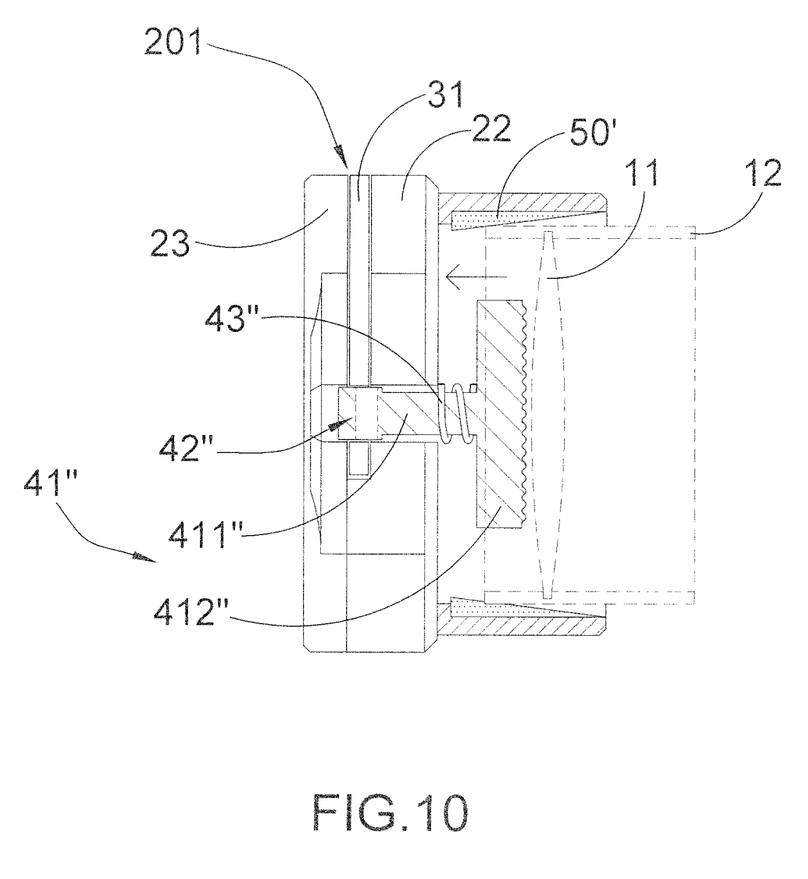
FIG. 10 is a side sectional view of the lens cover according to the above preferred embodiment of the present invention, illustrating the second alternative mode of the locking mechanism.

FIGS. 9 and 10 illustrates a second alternative mode of the locking mechanism 40", which comprises a locking latch 41" formed at the sidewall 21 of the cover body 20 and a locking fastener 42" formed at the peripheral edge of the cover panel 31 in such a manner that when the cover panel 31 is rotated to cover at the cover body 20, the locking fastener 42" is engaged with the locking latch 41" to retain the cover panel 31 in the covered position.

Accordingly, the locking latch 41" is formed at an opposed end of the guiding slot 201 and comprises a latch member 411" slidably coupled at the sidewall of the cover body and a push button 412" arranged in such manner that when the push button 412" is pushed, the latch member 411" is driven to slide and to disengage with the locking fastener 42" so as to enable the cover panel 31 to be moved in the uncovered position. A locker spring 43" is coupled at the latch member 411" of the locking latch 41' for applying a spring force against the push button 412" with respect to the cover body 20 so as to ensure the latch member 411" normally engaged with the locking fastener 42".

Figure 11:
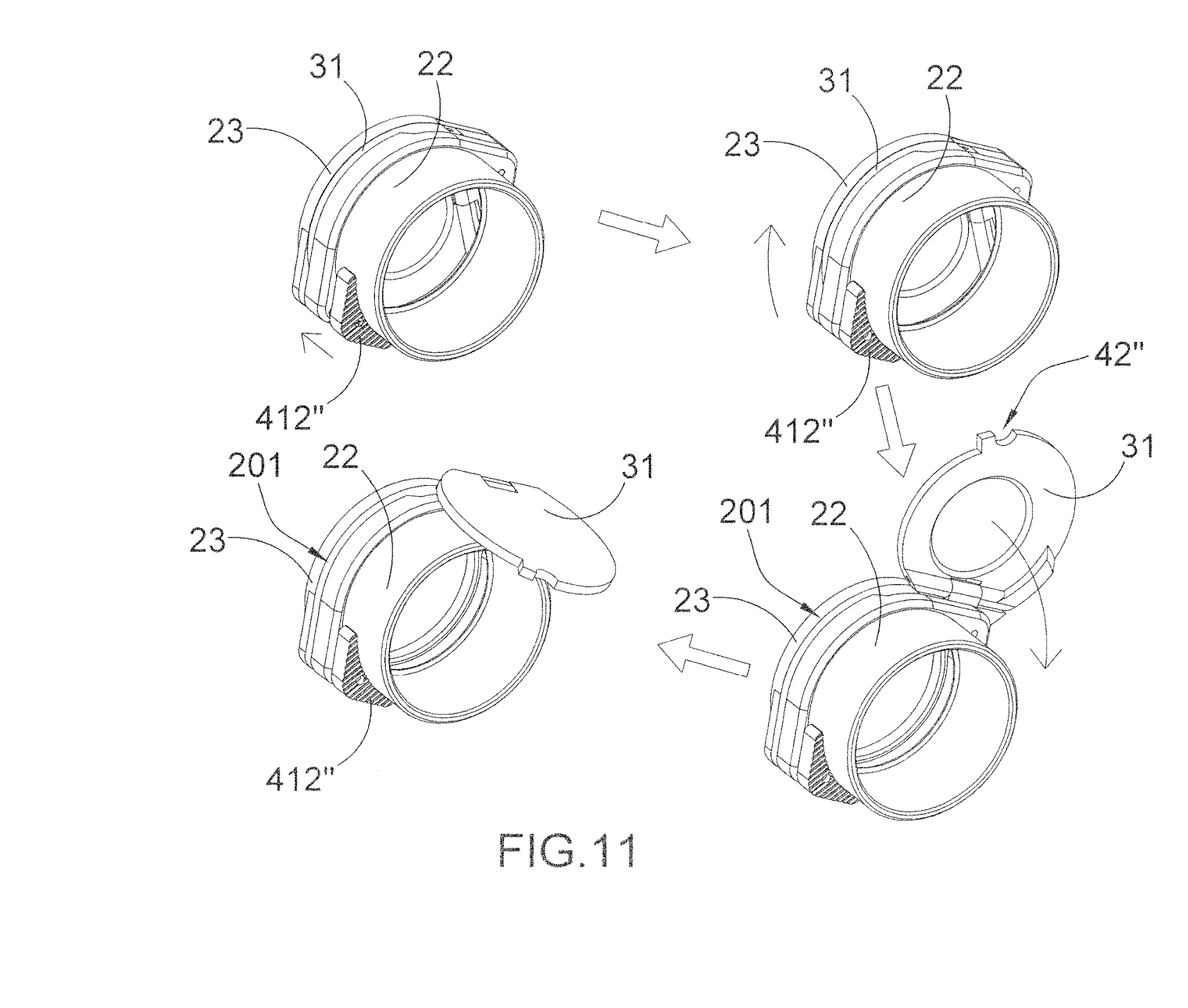
FIG. 11 illustrates the folding movement of the cover panel of the lens cover via the second alternative locking mechanism according to the above preferred embodiment of the present invention, illustrating the cover panel in a covered position, in an initial state of an uncovered position, and in a final state of the uncovered position.

The locking fastener 42" integrally formed at the peripheral edge of the cover panel 31 to serve as a protruded locking edge portion thereof. The cover panel 31 is guided to slide into the guiding slot 201 until the locking fastener 42" is engaged with the latch member 411" of the locking latch 41" to retain the cover panel 31 in the covered position. Accordingly, the locking member 411" has an indented portion arranged in such a manner that when the locking member 411" is pushed by the push button 412" to align the indented portion with the locking fastener 42", the engagement between the locking latch 41" and the locking fastener 42' is released. Therefore, once the locking mechanism 40" is released, the cover panel 31 is outwardly rotated from the covered position to the initial state of the uncovered position and is then rearwardly flipped in the final state of the uncovered position, as shown in FIG. 11.

It is worth mentioning that when two lens covers of the present invention are coupled at two ends of the lens equipment 10 respectively, the locking mechanisms 40 can serve as a common locking device, wherein one locking latch can be actuated to disengage with two locking fasteners at two lens covers. Therefore, the viewer is able to actuate the single locking latch to unlock two locking mechanisms and to concurrently move the two cover panels from the covered position to the uncovered position.

It is appreciated that the lens cover of the present invention can be built-in with the lens equipment 10, wherein the sidewall 21 of the cover body 20 is integrally extended from the lens housing 12 to form a one piece integrated tubular structure, such that the cover panel 31 is located in front of the lens 11 of the lens equipment 10. In addition, when the lens cover of the present invention is built-in with the lens equipment 10, the cover panel 31 can serve as a lens 11 of the lens equipment 10. In other words, the lens 11 of the lens equipment 10 can be moved from the covered position to the uncovered position. Likewise, the cover panel 31 can serve as a secondary lens aligned with the lens 11 of the lens equipment 10 when the cover panel 31 is moved at the covered position.

Furthermore, the cover panel 31 can be a lens filter for modifying images through the lens 11 when the cover panel 31 is moved at the covered position and in front of the lens 11. For example, the cover panel 31 can be a UV filter, polarizing filter, or an infrared filter.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lens cover for a lens equipment which comprises a lens received at an opening of a lens housing, comprising:

a tubular cover body, which comprises an attachment body having a tubular sidewall for detachably coupling at said lens housing in front of said lens, and a front frame coupled at a front edge of said attachment body, wherein a guiding slot is a through slot formed at a circumference of said cover body, wherein said guiding slot is formed in an arc shape to have two ends and is formed between said front edge of said attachment body and a rear edge of said front frame;

a cover module which comprises a cover panel and a joint unit coupled between said sidewall of said cover body and a peripheral edge of said cover panel to enable said cover panel to be continuously moved among a covered position, an initial state of an uncovered position, and a final state of an uncovered position that two folding movements of said cover panel at two different directions are continuously provided between said covered position and said final state of said uncovered position, wherein said joint unit comprises a first rotatable shaft located at one end of said guiding slot and orientated parallel to said sidewall of said cover body to enable said cover panel to be sidewardly rotated about said first rotatable shaft at a planar direction of said cover body, and a second rotatable shaft orientated perpendicular to said first rotatable shaft, wherein in said covered position, said cover panel is supported at a front portion of said cover body at said guiding slot and behind said front frame for covering said lens, in said initial state of said uncovered position, said cover panel is rotated sidewardly about said first rotatable shaft of said joint unit and is slid out of said guiding slot behind said front frame for uncovering said lens, such that said cover panel is guided to slide between said rear edge of said front frame and said front edge of said attachment body to slide out of said guiding slot as said through slot, and in said final state of said uncovered position, said cover panel is rearwardly flipped via said second rotatable shaft of said joint unit to rest on said sidewall of said cover body, such that said cover panel is rotated sidewardly and flipped rearwardly in one continuous action from said covered position to said final state of said uncovered position, wherein said joint unit further comprises a first resilient element coupled at said first rotatable shaft for applying a pushing force against said cover panel to push said cover panel being rotated about said first rotatable shaft from said covered position to said initial state of said uncovered position, and a second resilient element coupled at said second rotatable shaft for applying a pushing force against said cover panel to push said cover panel being flipped about said second rotatable shaft from said initial state of said uncovered position to said final state of said uncovered position; and a locking mechanism extended from said cover body for releasably locking said cover panel in said covered position to prevent said cover body from sliding out of said guiding slot.

2. The lens cover, as recited in claim 1, wherein said joint unit and said locking mechanism are spacedly located at two opposite sides of said sidewall of said cover body.

3. The lens cover, as recited in claim 2, wherein said front edge of said attachment body has an indented portion to form said guiding slot at a position behind said rear edge of said front frame, wherein said guiding slot is circumferentially and indentedly formed at said sidewall of said cover body at said front portion thereof, wherein said cover panel is guided to slide at said guiding slot to said covered position and is guided to slide out of said guiding slot to said initial state of said uncovered position.

4. The lens cover, as recited in claim 3, wherein said front frame is detachably coupled at said attachment body to form said guiding slot between said front edge of said attachment body and said rear edge of said front frame so as to guide said cover panel to receive behind said front frame in said covered position.

5. The lens cover, as recited in claim 3, wherein said guiding slot is circumferentially and indentedly formed at said sidewall of said cover body and is extended from said joint unit to said locking mechanism.

6. The lens cover, as recited in claim 5, wherein said locking mechanism is provided at said cover body at an opposed end of said guiding slot, such that said joint unit and said locking mechanism are located at said two ends of said guiding slot respectively.

7. The lens cover, as recited in claim 5, wherein said front frame is detachably coupled at said attachment body to form said guiding slot between said front edge of said attachment body and said rear edge of said front frame so as to guide said cover panel to receive behind said front frame in said covered position.

8. The lens cover, as recited in claim 7, wherein said joint unit comprises a rotatable joint coupled at said sidewall of said cover body to enable said cover panel to be sidewardly rotated at said rotatable joint so as to move said cover panel at said initial state of said uncovered position, and a flipping joint coupled at said peripheral edge of said cover panel to enable said cover panel to be rearwardly flipped to rest on said sidewall of said cover body so as to move said cover panel at said final state of said uncovered position, wherein said rotatable joint and said flipping joint are integrated together to form a joint member which is coupled between said sidewall of said cover body and said peripheral edge of said cover panel, wherein said first resilient element comprises a first coil body coupled at said first rotatable shaft and two first coil arms biasing against said joint member and said sidewall of said cover body, wherein said second resilient element comprises a second coil body coupled at said second rotatable shaft and two second coil arms biasing against said joint member and said peripheral edge of said cover panel.

9. The lens cover, as recited in claim 8, wherein said locking mechanism is provided at said cover body at an opposed end of said guiding slot, such that said joint unit and said locking mechanism are located at said two ends of said guiding slot respectively.

10. The lens cover, as recited in claim 1, wherein said front edge of said attachment body has an indented portion to form said guiding slot at a position behind said rear edge of said front frame, wherein said guiding slot is circumferentially and indentedly formed at said sidewall of said cover body at said front portion thereof, wherein said cover panel is guided to slide at said guiding slot to said covered position and is guided to slide out of said guiding slot to said initial state of said uncovered position.

11. The lens cover, as recited in claim 10, wherein said locking mechanism comprises a locking latch formed at said sidewall of said cover body and a locking fastener formed at said peripheral edge of said cover panel in such a manner that when said cover panel is rotated to cover at said cover body, said locking fastener is engaged with said locking latch to retain said cover panel in said covered position.

12. The lens cover, as recited in claim 10, wherein said joint unit comprises a rotatable joint coupled at said sidewall of said cover body to enable said cover panel to be sidewardly rotated at said rotatable joint so as to move said cover panel at said initial state of said uncovered position, and a flipping joint coupled at said peripheral edge of said cover panel to enable said cover panel to be rearwardly flipped to rest on said sidewall of said cover body so as to move said cover panel at said final state of said uncovered position, wherein said rotatable joint and said flipping joint are integrated together to form a joint member which is coupled between said sidewall of said cover body and said peripheral edge of said cover panel, wherein said first resilient element comprises a first coil body coupled at said first rotatable shaft and two first coil arms biasing against said joint member and said sidewall of said cover body, wherein said second resilient element comprises a second coil body coupled at said second rotatable shaft and two second coil arms biasing against said joint member and said peripheral edge of said cover panel.

13. The lens cover, as recited in claim 12, wherein said locking mechanism comprises a locking latch supported at said sidewall of said cover body and a locking fastener formed at said peripheral edge of said cover panel in such a manner that when said cover panel is rotated to cover at said cover body, said locking fastener is engaged with said locking latch to retain said cover panel in said covered position.

14. The lens cover, as recited in claim 13, wherein said locking latch is formed at one end of said guiding slot, such that when said cover panel is guided to slide at said guiding slot, said locking fastener is engaged with said locking latch to retain said cover panel in said covered position.

15. The lens cover, as recited in claim 14, wherein said locking latch comprises a pivot latch, which is pivotally coupled at said sidewall of said cover body, having a catching end engaging with said locking fastener and an actuating end arranged in such a manner that when said actuating end of said pivot latch is pressed, said catching end of said pivot latch is disengaged with said locking fastener to enable said cover panel to be moved in said initial state of said uncovered position.

16. The lens cover, as recited in claim 14, wherein said locking mechanism further comprises a handle member integrally extended from said peripheral edge of said cover panel corresponding to said locking fastener and arranged in such a manner that when said handle member is sidewardly pushed, said locking fastener is disengaged with said locking latch to enable said cover panel to be moved in said initial state of said uncovered position.

17. The lens cover, as recited in claim 14, wherein said locking latch comprises a latch member slidably coupled at said sidewall of said cover body and a push button arranged in such manner that when said push button is pushed, said latch member is driven to slide and to disengage with said locking fastener so as to enable said cover panel to be moved in said initial state of said uncovered position.

18. The lens cover, as recited in claim 17, further comprising a flexible member provided at an interior side of said sidewall of said cover body, wherein said flexible member has a predetermined thickness for being sandwiched between said sidewall of said cover body and said lens housing so as to enable said lens housing to be fitted into said sidewall of said cover body.

19. The lens cover, as recited in claim 1, wherein said joint unit comprises a rotatable joint coupled at said sidewall of said cover body to enable said cover panel to be sidewardly rotated at said rotatable joint so as to move said cover panel at said initial state of said uncovered position, and a flipping joint coupled at said peripheral edge of said cover panel to enable said cover panel to be rearwardly flipped to rest on said sidewall of said cover body so as to move said cover panel at said final state of said uncovered position, wherein said rotatable joint and said flipping joint are integrated together to form a joint member which is coupled between said sidewall of said cover body and said peripheral edge of said cover panel, wherein said first resilient element comprises a first coil body coupled at said first rotatable shaft and two first coil arms biasing against said joint member and said sidewall of said cover body, wherein said second resilient element comprises a second coil body coupled at said second rotatable shaft and two second coil arms biasing against said joint member and said peripheral edge of said cover panel.

20. The lens cover, as recited in claim 1, wherein said locking mechanism is provided at said cover body at an opposed end of said guiding slot, such that said joint unit and said locking mechanism are located at said two ends of said guiding slot respectively.

21. The lens cover, as recited in claim 1, wherein said locking mechanism comprises a locking latch formed at said sidewall of said cover body and a locking fastener formed at said peripheral edge of said cover panel in such a manner that when said cover panel is rotated to cover at said cover body, said locking fastener is engaged with said locking latch to retain said cover panel in said covered position.

22. The lens cover, as recited in claim 1, further comprising a flexible member provided at an interior side of said sidewall of said cover body, wherein said flexible member has a predetermined thickness for being sandwiched between said sidewall of said cover body and said lens housing so as to enable said lens housing to be fitted into said sidewall of said cover body.

* * * * *